US010933596B2

(12) United States Patent
Klincik et al.

(10) Patent No.: US 10,933,596 B2
(45) Date of Patent: Mar. 2, 2021

(54) SYSTEM AND METHOD FOR SPLICING PLIES IN STRINGER SHEETS

(71) Applicant: SPIRIT AEROSYSTEMS, INC., Wichita, KS (US)

(72) Inventors: Johnathan Scott Klincik, Wichita, KS (US); James Edward Westerman, Derby, KS (US); Tobias DiGennaro, Andover, KS (US); Darin Clay Wiley, Wellington, KS (US); Blaise Francis Bergmann, Clearwater, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 123 days.

(21) Appl. No.: 16/015,412

(22) Filed: Jun. 22, 2018

(65) Prior Publication Data
US 2019/0389151 A1 Dec. 26, 2019

(51) Int. Cl.
*B29C 70/38* (2006.01)
*B32B 1/00* (2006.01)
*B32B 7/12* (2006.01)
*B32B 7/05* (2019.01)
*B29L 31/30* (2006.01)
*B64F 5/10* (2017.01)
*B29C 65/00* (2006.01)

(52) U.S. Cl.
CPC ............ *B29C 70/386* (2013.01); *B32B 1/00* (2013.01); *B32B 7/05* (2019.01); *B32B 7/12* (2013.01); *B29C 66/1122* (2013.01); *B29L 2031/3076* (2013.01); *B32B 2605/18* (2013.01); *B64F 5/10* (2017.01)

(58) Field of Classification Search
CPC .............. B64F 5/10; B29L 2031/3082; B29L 2031/3085; B32B 2605/18; B64C 3/182; B64C 1/064; B29C 66/1122; B29C 70/386
USPC ...................................... 156/304.1
See application file for complete search history.

(56) References Cited

U.S. PATENT DOCUMENTS

| 2009/0148647 | A1* | 6/2009 | Jones | B29C 31/08 428/58 |
| 2009/0205767 | A1* | 8/2009 | Lauder | B29C 70/545 156/64 |
| 2012/0135099 | A1 | 5/2012 | Dean et al. | |
| 2016/0257427 | A1* | 9/2016 | Humfeld | B29C 66/721 |
| 2017/0081015 | A1 | 3/2017 | Charles | |
| 2019/0375190 | A1* | 12/2019 | Duval | B32B 7/03 |

* cited by examiner

*Primary Examiner* — Carson Gross
(74) *Attorney, Agent, or Firm* — Hovey Williams LLP

(57) ABSTRACT

A system and method for splicing multiple plies of material together during the construction of a stringer sheet. A first ply layer is laid onto a portion of a surface of a tool having a contour which defines a stringer, and the first ply layer is pressed down such that an edge of the first ply layer is located on the contour. A second ply layer is laid onto an adjacent portion of the surface, and the second ply layer is pressed down such that the edge of the second ply layer is located on the contour and overlaps the edge of the first ply layer. This process may be repeated for additional ply layers. The system may include an end-effector having a dispenser of the plies of material and a roller for pressing the plies, and a movement mechanism for moving the end-effector over the tool.

20 Claims, 10 Drawing Sheets

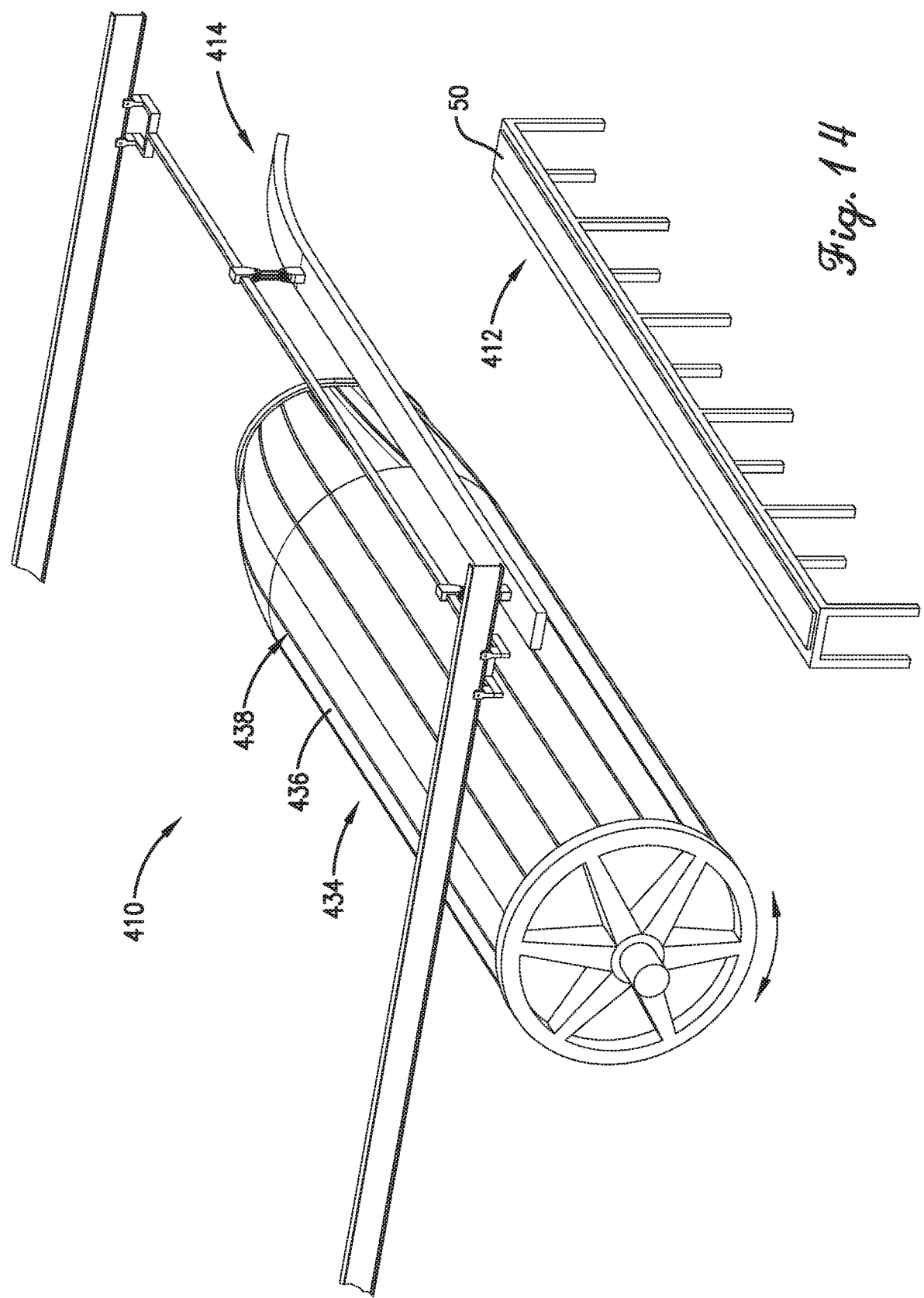

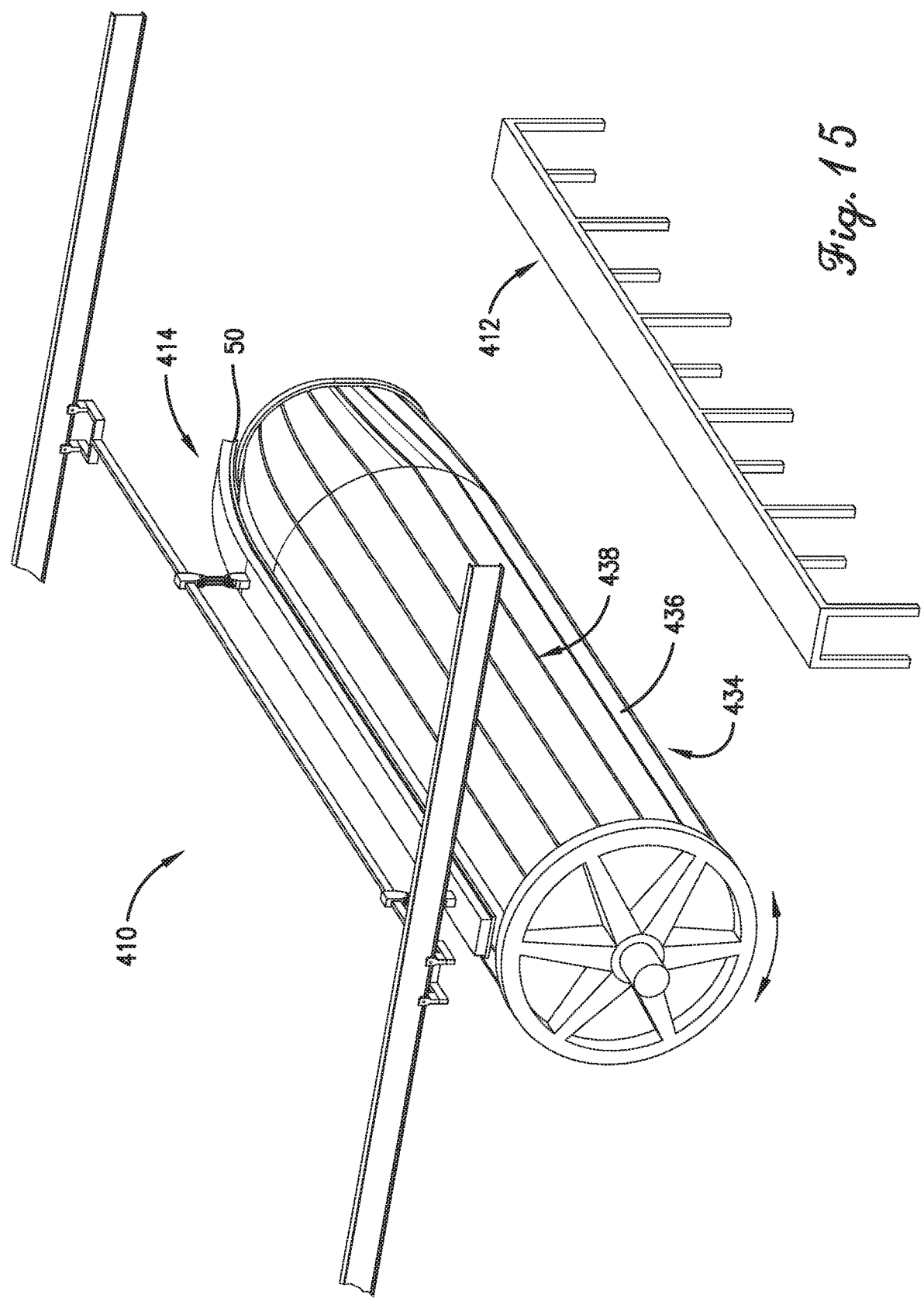

SYSTEM AND METHOD FOR SPLICING PLIES IN STRINGER SHEETS

FIELD

The present invention relates to systems and methods for making composite panel structures, and more particularly, embodiments concern a system and method for splicing a plurality of ply layers of a material together during the construction of a stringer sheet, such as is used in the fuselages and wings of aircraft or other body components of vehicles.

BACKGROUND

Stringers are longitudinal members used to reinforce skins in panels, such as the panels used in the fuselages and wings of aircraft. The stringers function to divide the skin into distinct sections, which allows the skin to safely buckle, controls circumferential damage to the skin, and provides stiffness against body-bending loads. In one implementation, individual stringers are constructed as distinct pieces that are attached to the skin using fasteners, welding, or bonding. In another implementation, a plurality of stringers is constructed in a stringer sheet, or "sheet stringer." With a stringer sheet, one or more composite plies are continuously joined to the inside of the skin, except where the plies are shaped to form concavities or convexities relative to the skin to create the stringers.

Stringer sheets are constructed by laying up the plies on a contoured tool, and pressing the plies into the contours to form the actual stringers. However, this pulls the edges of the ply material together, which changes the width of the plies on the tool. Forming the plies around one stringer invariably shortens the sheet of plies, which can pull the plies away at other stringers. Also, the exact depth to which the plies bend into the contours of the tool can cause variations in the required overall width of the plies. In more detail, if a single large sheet of material spanning multiple stringers is used, then the entire sheet will move when it is pushed into each contour to form a stringer, resulting in an undesirable change in overall dimensions. If a smaller sheet is used and centered on the contour, then the edges of the sheet, which are located in the area between the stringers, will be pulled inwardly, again resulting a change in dimensions and gaps between adjacent sheets. One solution is to overlap the edges of these adjacent sheets, but this results in additional thickness in the area between the stringers which provides no other benefit and adds undesirable extra weight.

This background discussion is intended to provide information related to the present invention which is not necessarily prior art.

SUMMARY

Embodiments address the above-described and other problems and limitations of the prior art by providing a system and method for splicing a plurality of ply layers of a material together during the construction of a stringer sheet, such as is used in the fuselages and wings of aircraft or other body components of vehicles.

In a first embodiment, a method is provided for splicing a plurality of plies of a material together during the construction of a stringer sheet. Broadly, the method may include the following. A first ply layer may be laid down onto a first portion of a surface of a tool, the surface having a contour defining a stringer in the stringer sheet. The first ply layer may be pressed onto the contour such that a first edge of the first ply layer is located on the contour. A second ply layer may be laid down onto a second portion of the surface of the tool, wherein the second portion is adjacent to the first portion of the surface of the tool. The second ply layer may be pressed onto the contour such that a second edge of the second ply layer is located on the contour, with the second ply layer overlapping the first ply layer on the contour.

Various implementations of the first embodiment may include any one or more of the following features. The first edge of the first ply layer may extend past a center of the contour in a first direction, and the second edge of the second ply layer may extend past the center of the contour in a second direction such that the first and second ply layers overlap at a center of the contour. The first edge of the first ply layer may extend past a center of the contour in the first direction, and the second edge of the second ply layer may not extend past the center of the contour in the second direction such that the first and second ply layers overlap at one side of the contour. The method may be repeated to lay down a third ply layer over the first ply layer and a fourth ply layer over the second ply layer, and wherein the third edge of the third ply layer may not extend past the center of the contour in the first direction, and the fourth edge of the fourth ply layer may extend past the center of the contour in the second direction such that the third and fourth ply layers overlap at an opposite side of the contour as the first and second ply layers. The first and second ply layers before may be at least partially cured before removing the first and second ply layers from the tool. An adhesive may be applied to the first edge of the first ply layer so that the second edge of the second ply layer overlaps the adhesive. The first ply layer and the second ply layer may be dispensed directly onto the surface of the tool. The first ply layer may be dispensed onto a flat surface and then transferred to the surface of the tool, and the second ply layer may be dispensed onto the flat surface and then transferred to the surface of the tool.

In a second embodiment, a system is provided for splicing a plurality of plies of a material together during the construction of a stringer sheet. The system may include an end-effector and a movement mechanism. The end-effector may include a dispenser configured to automatically dispense a ply layer of a material onto a surface of a tool, and a roller configured to automatically press the ply layer onto the surface of the tool, and to automatically press an edge of the ply layer onto a contour of the surface of the tool, wherein the contour defines a stringer in the stringer sheet. The movement mechanism may be configured to automatically move the end-effector over the tool. In operation the system is configured to function as follows. The dispenser may dispense a first ply layer onto a first portion of the surface of a tool, and the roller may press the first ply layer onto the contour such that a first edge of the first ply layer is located on the contour, as the movement mechanism moves the end-effector over the tool. The movement mechanism may shift a position of the end-effector relative to the tool. The dispenser may dispense a second ply layer onto a second portion of the surface of the tool, wherein the second portion may be adjacent to the first portion of the surface of the tool, and the roller may press the second ply layer onto the contour such that a second edge of the second ply layer is located on the contour with the second ply layer overlapping the first ply layer on the contour, as the movement mechanism moves the end-effector over the tool.

In a third embodiment, a system is provided for splicing a plurality of plies of a material together during the construction of a stringer sheet. The system may include a dispenser, a transfer mechanism, and a forming mechanism. The dispenser may be configured to automatically lay down a first ply layer onto a flat surface. The transfer mechanism may be configured to transfer the first ply layer from the flat surface to a tool surface of a tool, the tool surface having a contour defining a stringer in the stringer sheet, with a first edge of the first ply layer being located on the contour. The forming mechanism may be configured to press the first ply layer onto the contour. The dispenser may be further configured to automatically lay down a second ply layer onto the flat surface. The transfer mechanism may be further configured to transfer the second ply layer from the flat surface to the tool surface of the tool, with a second edge of the first ply layer being located on the contour and overlapping the first edge of the first ply layer. The forming mechanism may be further configured to press the second ply layer onto the contour and the first edge of the first ply layer.

Various implementations of the second and third embodiments may include any one or more of the following features. The first edge of the first ply layer may extend past a center of the contour in a first direction, and the second edge of the second ply layer may extend past the center of the contour in a second direction such that the first and second ply layers overlap at a center of the contour. The first edge of the first ply layer may extend past a center of the contour in the first direction, and the second edge of the second ply layer may not extend past the center of the contour in the second direction such that the first and second ply layers overlap at one side of the contour. The system may be further configured to dispense/transfer a third ply layer over the first ply layer, and to dispense/transfer a fourth ply layer over the second ply layer, and wherein the third edge of the third ply layer may not extend past the center of the contour in the first direction, and the fourth edge of the fourth ply layer may extend past the center of the contour in the second direction such that the third and fourth ply layers overlap at an opposite side of the contour as the first and second ply layers. The system may further include an adhesive applicator configured to apply an adhesive to the first edge of the first ply layer so that the second edge of the second ply layer overlaps the adhesive. The system may further include a heater mechanism configured to automatically heat the ply layer as the ply layer is dispensed so that the ply layer sticks and forms to the surface of the tool.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 2:
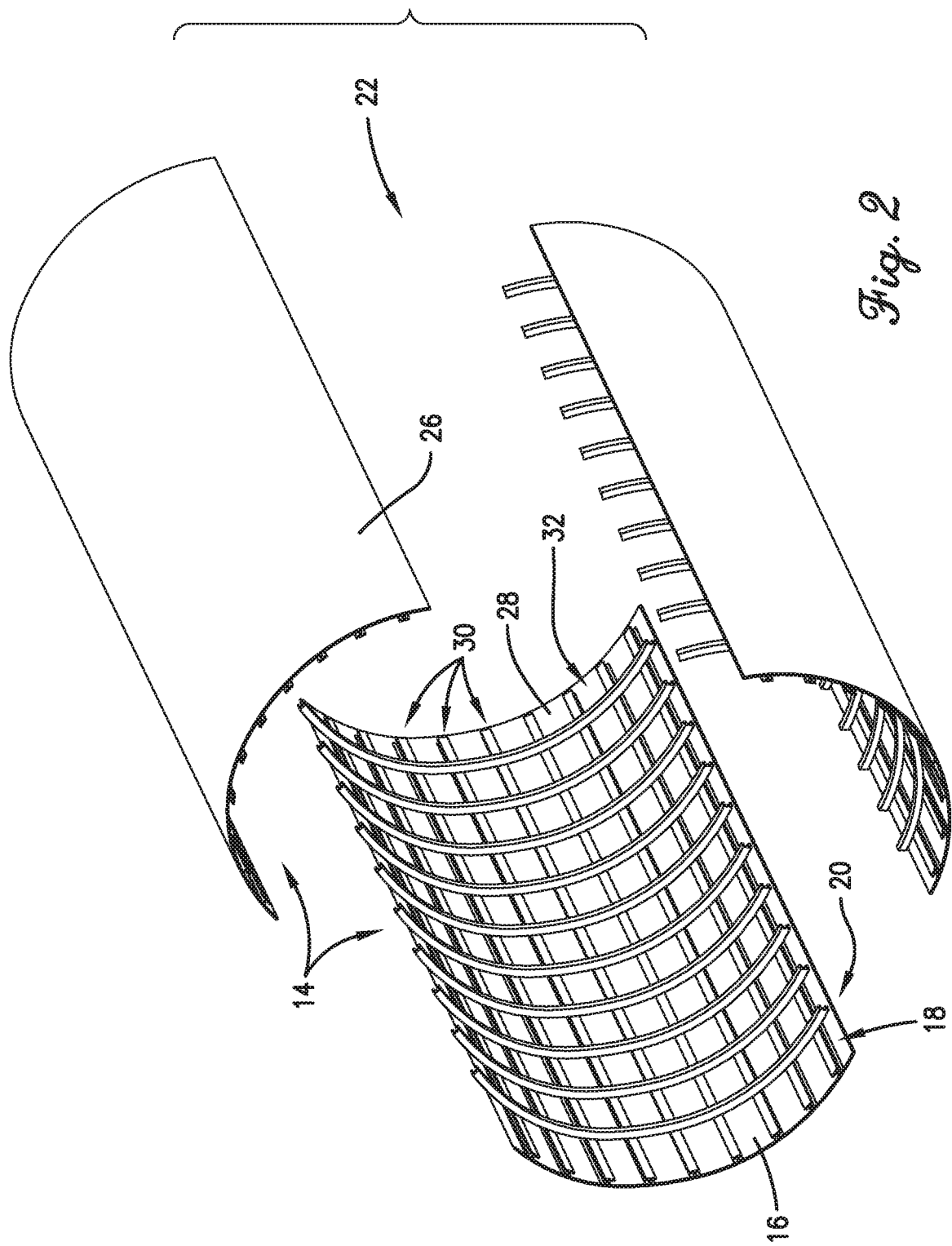
FIG. 2 is an exploded isometric view of a portion of the fuselage of FIG. 1 showing details of the example panel structure including the example stringer sheet.

FIG. 14 is an isometric view of a second embodiment of a system for splicing a plurality of plies of material together during the construction of a stringer sheet, such as the example stringer sheet of FIG. 2, wherein the system is shown retrieving a ply layer from a flat surface; and FIG. 15 is an isometric view of the system of FIG. 14, wherein the system is shown depositing the retrieved ply layer onto a tool.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments concern a system and method for splicing a plurality of ply layers of a material together during the construction of a stringer sheet, such as is used in the fuselages and wings of aircraft or other body components of vehicles. The stringer sheet may be constructed by laying up a plurality of plies layers on a surface of a tool. The surface of the tool may present a plurality of spaced-apart contours, which may be concavities, convexities, or some combination thereof, and which form a plurality of stringers in the finished stringer sheet. In more detail, the stringers may take the form of spaced-apart changes in shape similar to a corrugated panel, which may result in discrete changes in an out-of-plane stiffness of the finished stringer sheet. Splicing the plurality of ply layers may involve laying multiple plies or ply-sets onto the tool while overlapping at least some of the plies or ply-sets by specific amounts. Various implementation may involve different overlap and staggering configurations. In one implementation, this may be done with an overlap of two plies or ply stacks. In another implementation, this may be done by interleaving multiple plies alternating in any sequence. In either case, the overlaps may be created at one location, such as centered on the stringer, or the overlaps may be staggered. The edges of each ply or ply-set may be pressed down into the concavity in the tool, which reduces the excess overlap, to achieve a desired final amount of overlap. If no amount of final overlap is desired, then the original overlap may be decreased to reduce it to a butt-splice when the stringer is formed.

Embodiments advantageously provide a more reliable and robust stringer sheet by splicing the ply layers together in a manner that better accounts for changes in the planar dimensions of the ply layers as intermediate portions of the ply layers accommodate changes in the shape of the tool. In particular, embodiments avoid gaps or other potential weak points which might otherwise result from the edges of adjacent ply layers pulling apart as a result of laying the ply layers into, over, or otherwise onto the contours on the surface of the tool. Further, the resulting increased thickness along the overlap advantageously increases the moment-of-inertia of the cross-section, thereby increasing the usable stiffness and axial strength of the stringer. Thus, in contrast to positioning the overlap in the area between the stringers, which provides no other benefit and adds undesirable extra weight, positioning the overlap in the stringers increases the thickness and strength of the stringers.

Although described herein in the example context of manufacturing stringer sheets, the present technology may be employed in the manufacture of substantially any product which would benefit therefrom, including products such as individual stringers, hybrid stringer skins, blade frames or floor beams, and wing spars or skins with integral stiffeners.

Figure 1:
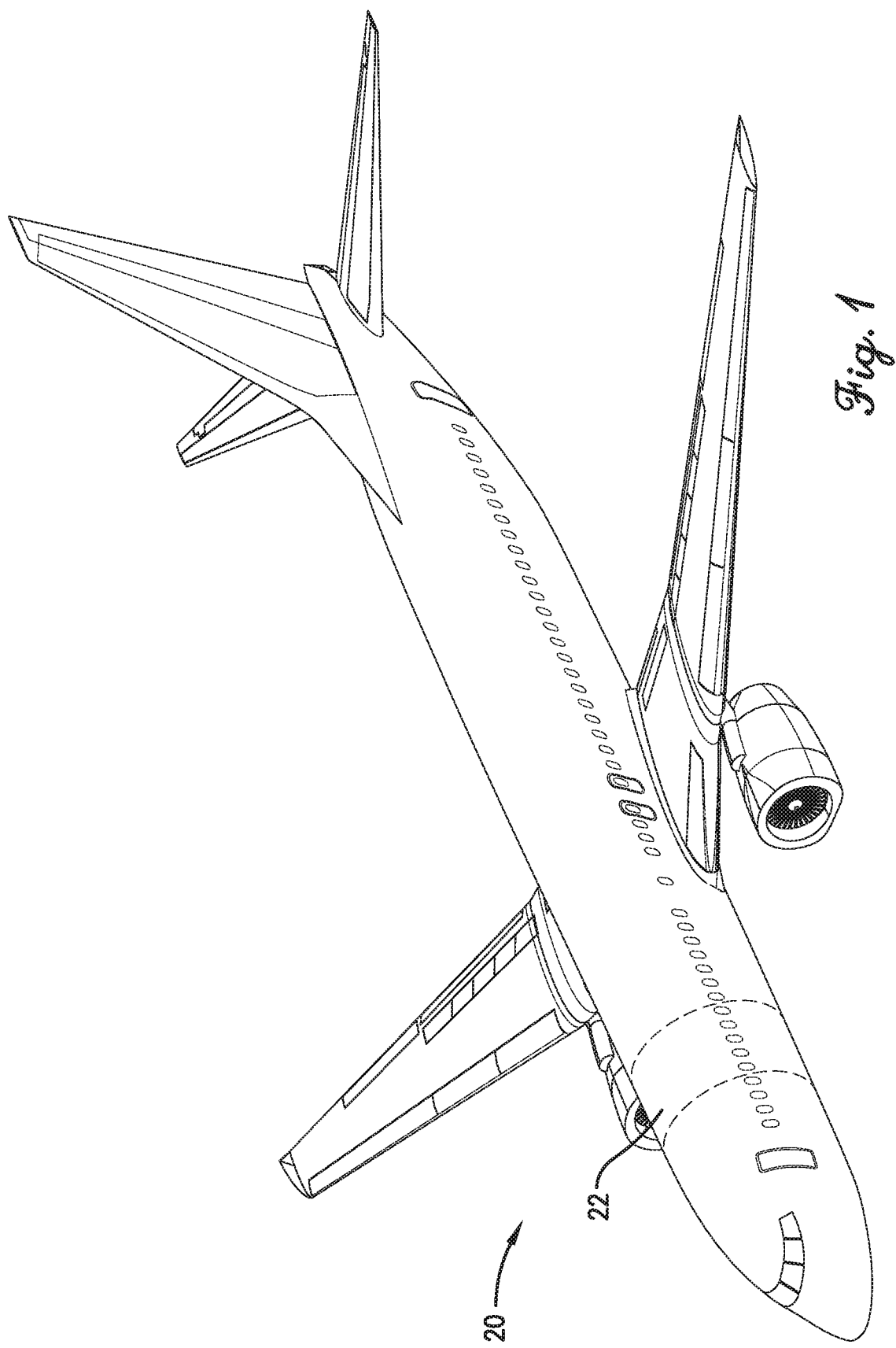
FIG. 1 is a fragmentary isometric view of an example aircraft having a fuselage incorporating an example panel structure including an example stringer sheet.
Figure 3:
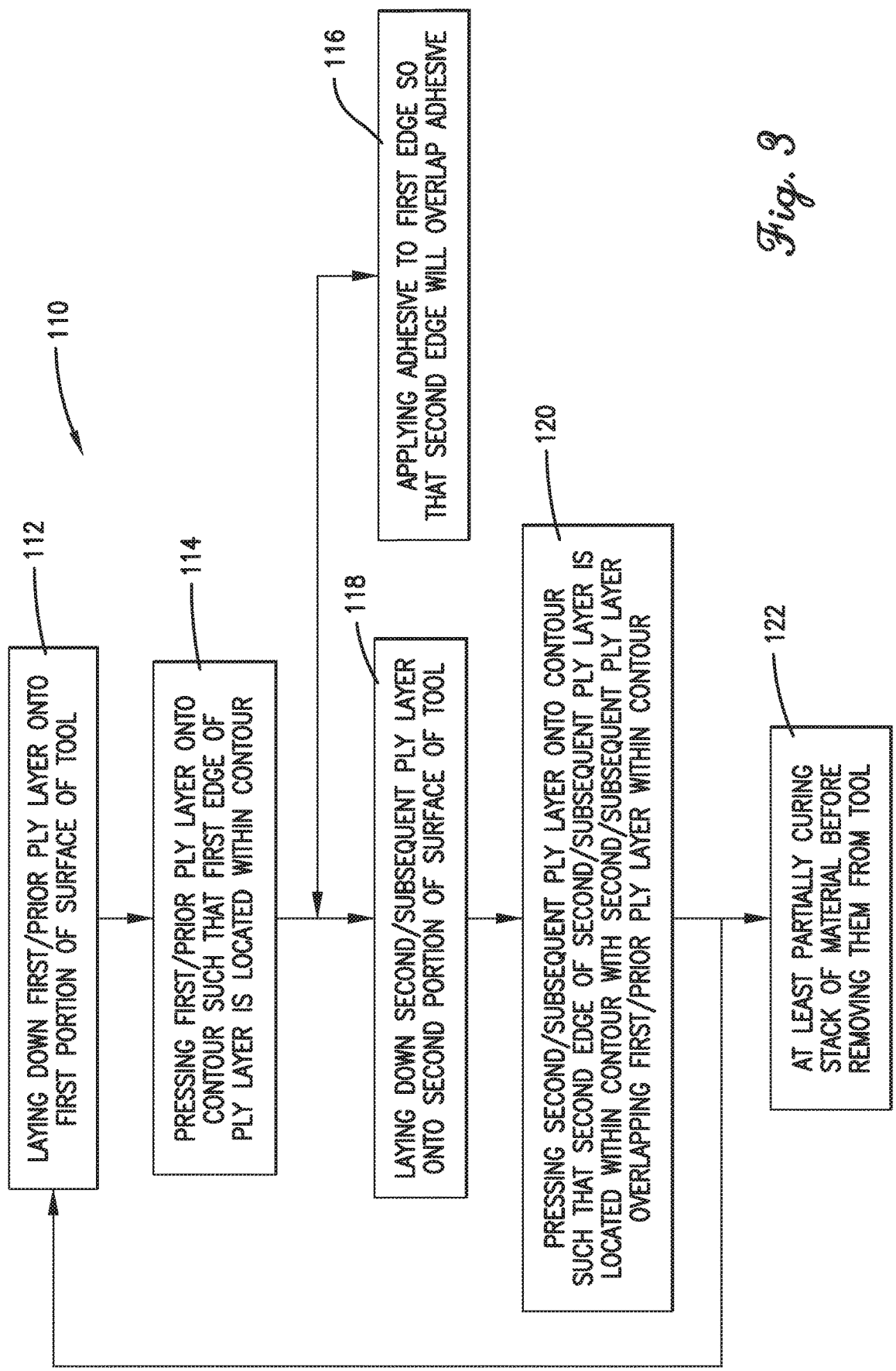
FIG. 3 is a flowchart of steps in a first embodiment of a method for splicing a plurality of plies of material together during the construction of a stringer sheet, such as the example stringer sheet of FIG. 2.
Figure 4:
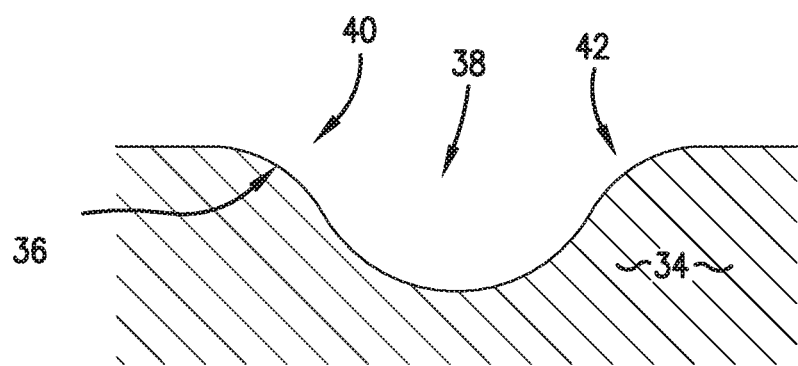
FIG. 4 is a fragmentary cross-sectional elevation view of a tool for constructing the stringer sheet.

Referring to FIGS. 1 and 2, an example aircraft 20 is shown having a fuselage 22 incorporating an example panel structure 24. The example panel structure 24 may include a skin 26, a stringer sheet 28 having a plurality of stringers 30, and a plurality of frame members 32. Referring to FIGS. 3 and 4, a first embodiment of a method 110 is shown for splicing a plurality of ply layers of material together during the construction of a stringer sheet, such as the example stringer sheet 28 of FIG. 2. The method 110 may make use of a tool 34, the tool 34 may have a surface 36, and the surface 36 may have a contour 38 which defines one of the stringers 30 in the stringer sheet 38, as seen in FIG. 4. The surface 36 may have a first portion 40 and a second portion 42, and the first portion 40 may be adjacent to the second 42.

The contour 38 may be a concavity, a convexity, or some combination thereof. Broadly, the method may comprise the following steps.

Figure 5:
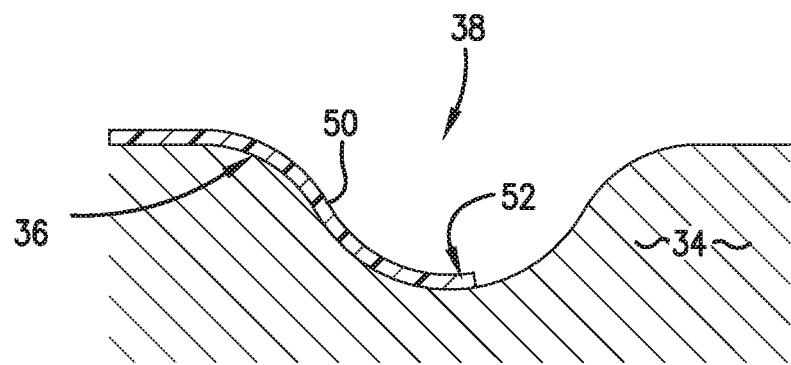
FIG. 5 is a fragmentary cross-sectional elevation view of a first ply layer laid onto the tool of FIG. 4.
Figure 6:
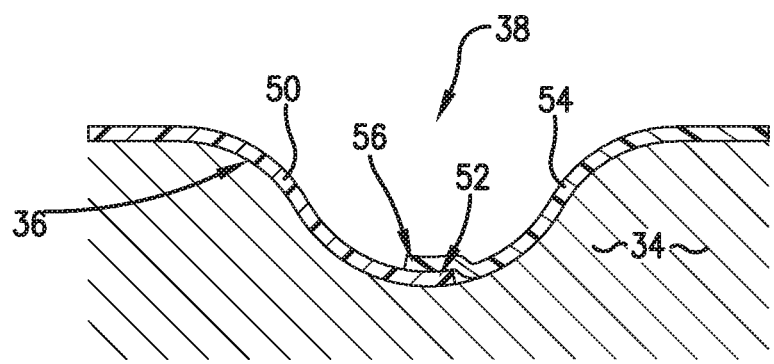
FIG. 6 is a fragmentary cross-sectional elevation view of a second ply layer laid onto the tool of FIG. 4 and overlapping the first ply layer.

A first or other prior ply layer 50 may be laid down onto the first portion 40 of the surface 36 of the tool 34, as shown in 112. The first/prior ply layer 50 may include a single ply, a plurality of plies, or a ply set. The first/prior ply layer 50 may be pressed into, over, or otherwise onto the contour 38 such that a first edge 52 of the first/prior ply layer 50 is located within or otherwise on the contour 38, as shown in 114, and as illustrated in FIG. 5. In one implementation, an adhesive may be applied to an exposed surface of the first edge 52 of the first/prior ply layer 50, as shown in 116. A second or other subsequent ply layer 54 may be laid down onto the second portion 42 of the surface 36 of the tool 34, as shown in 118. The second/subsequent ply layer 54 may similarly include a single ply, a plurality of plies, or a ply set. The second/subsequent ply layer 54 may be pressed into, over, or otherwise onto the contour 38, as shown in 120, such that a second edge 56 of the second/subsequent ply layer 54 is located within or otherwise on the contour 38 with the second/subsequent ply layer 54 overlapping the first/prior ply layer 50 within or otherwise on the contour 38, as illustrated in FIG. 6. In various implementations, the overlap of the first/prior and second/subsequent ply layers 50,54 may be at least one-quarter inch, no more than two inches, no more than one inch, no more than one-half inch, between one-quarter inch and one inch, or between one-quarter inch and one-half inch. This process may be repeated for additional ply layers, as needed or desired. In one implementation, the ply layer 50,54 may be at least partially cured before removing the ply layers 50,54 from the tool 34, as shown in 122.

Figure 7:
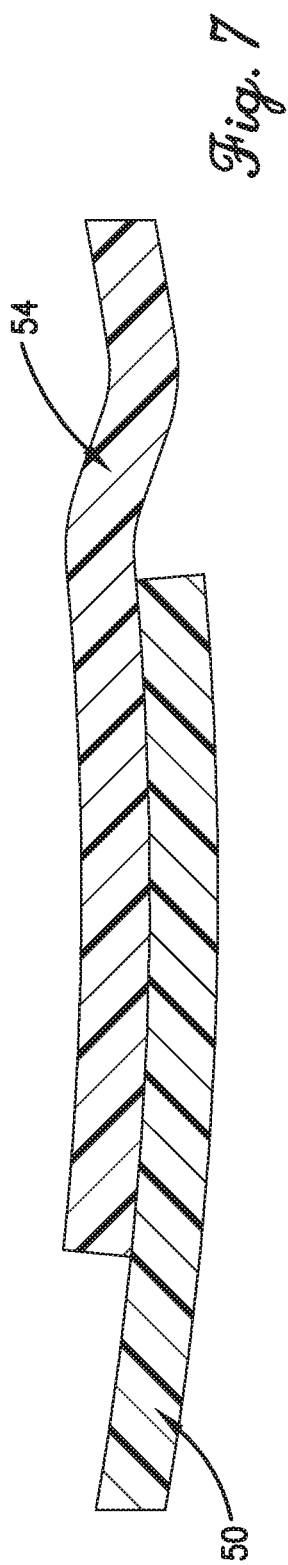
FIG. 7 is a fragmentary cross-sectional elevation view of the stringer sheet showing a first implementation for splicing the plies.

The pattern in which the ply layers 50,54 are laid down with respect to particular contours may depend on the particular application, including the nature and performance requirements for the structure into which the stringer sheet is to be incorporated. In the implementation shown in FIG. 6, the first edge 52 of the first/prior ply layer 50 may extend past a center of the contour 38 in a first direction, and the second edge 56 of the second/subsequent ply layer 54 may extend past the center of the contour 38 in a second direction, such that the first/prior and second/subsequent ply layers 50,54 overlap at a center of the contour. Referring to FIG. 7, a version of this implementation is shown in which the ply layers 50,54 for the complete thickness of the stringer sheet may be grouped into "ply-sets." These ply-sets may then be arranged so that adjacent ply-sets overlap each other. The overlap may be centered within or otherwise on the contour, with a small amount (e.g., one-eighth inch) from each ply-set extending over the center of the contour to create the overlap (e.g., one-quarter inch).

Figure 8:
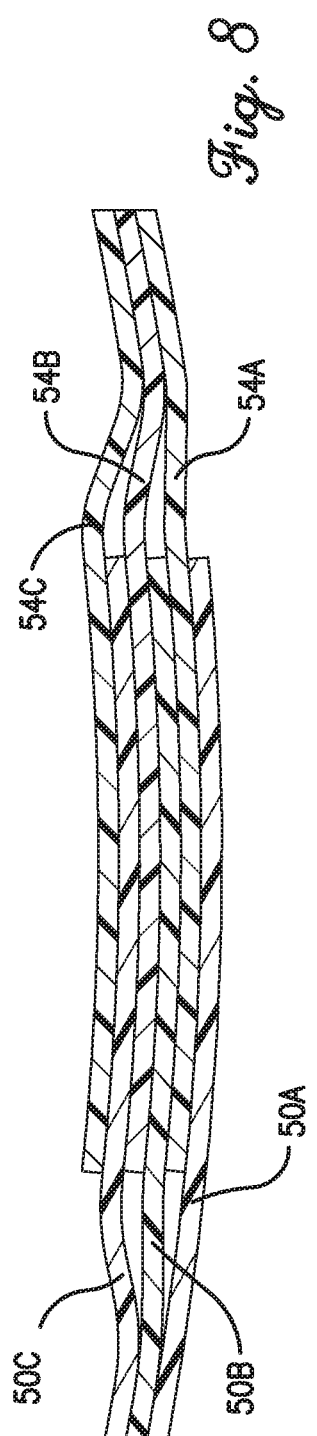
FIG. 8 is a fragmentary cross-sectional elevation view of the stringer sheet showing a second implementation for splicing the plies.

Referring to FIG. 8, another version of this implementation is shown in which individual ply layers 50A,54A,50B, 54B,50C,54C may be alternated to create an interleaved overlap. The overlap may be centered within or otherwise on the contour, with a small amount from each ply extending over the centerline of the contour to create the overlap. The plies may be alternately placed, so a ply from one side of the stringer may be placed, and then a ply from the other side may be placed, and so on, until all the plies are placed.

In another implementation, the first edge of the first ply layer may extend past a center of the contour in the first direction, and the second edge of the second ply layer may not extend past the center of the contour in the second direction, such that the first and second ply layers overlap at one side of the contour. This results in an overlap similar to what is shown in FIGS. 7 and 8 but with the center of the overlap being located to one side of the center of the contour. In an extension of this implementation, a third ply layer may be laid down over the first ply layer and a fourth ply layer may be laid down over the second ply layer. A third edge of the third ply layer may not extend past the center of the contour in the first direction, and a fourth edge of the fourth ply layer may extend past the center of the contour in the second direction, such that the third and fourth ply layers overlap at an opposite side of the contour as the first and second ply layers. This results in staggered overlaps, with the overlap of the first pair of ply layers being on one side of the center of the contour, and the overlap of the second pair of ply layers being on the second side of the contour.

Figure 9:
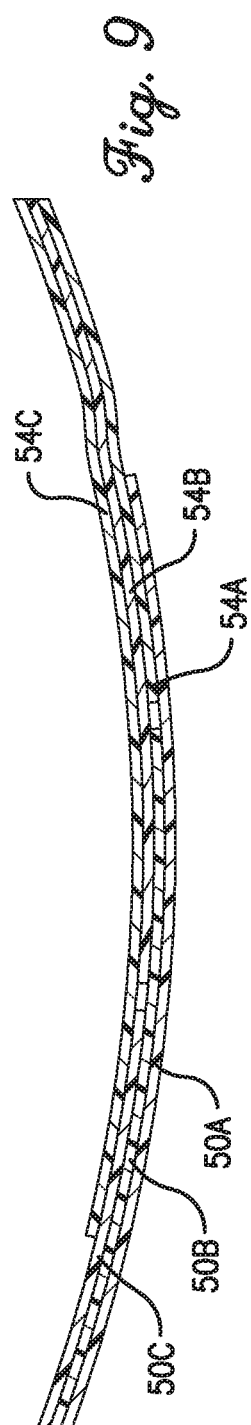
FIG. 9 is a fragmentary cross-sectional elevation view of the stringer sheet showing a third implementation for splicing the plies.

Referring to FIG. 9, in another implementation, staggered butt splices may be created with overlapping inner and outer layers. The ply layers may be laid with the following sequence. The lengths are examples, and may be changed as desired or needed. A first ply layer 50A may be laid onto the tool, extending past the centerline by approximately one inch. A second ply layer 54A may be laid, short of the centerline by approximately one-half inch. A third ply layer 50B may be laid, extending past the centerline by slightly less than one-half inch, so that it touches or nearly touches the edge of the second ply layer 54A. A fourth ply layer 54B may be laid, extending to the centerline. A fifth ply layer 50C may be laid, just short of the centerline, so that it touches or nearly touches the edge of the fourth ply layer 54B. A sixth ply layer 54C may be laid, extending past the centerline by approximately one-half inch. These distances may be adjusted as desired or needed for particular application. For example, the plies may be repositioned so that the butt joints between the second and third ply layers 54A,50B and between the fourth and fifth ply layers 54B,50C are centered on the stringer, with the former being approximately one-half inch on the one side of the centerline, and the latter being approximately one-half inch on the other side of the centerline.

In each of the foregoing implementation, overlapping the ply layers advantageously avoids gaps or other potential weak points which might otherwise result from the edges of adjacent plies pulling apart as a result of laying the plies into or over the contours on the surface of the tool. Further, the increased thickness along the overlap advantageously increases the moment-of-inertia of the cross section, thereby increasing the usable stiffness and axial strength of the stringer.

Figure 10:
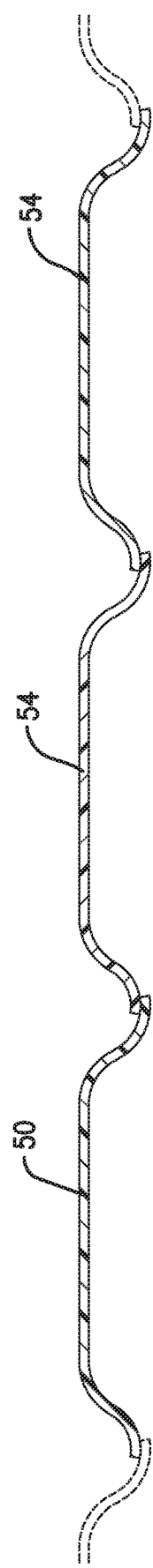
FIG. 10 is a fragmentary cross-sectional elevation view of the stringer sheet showing a shingle method for laying down multiple plies to create multiple stringers.
Figure 11:
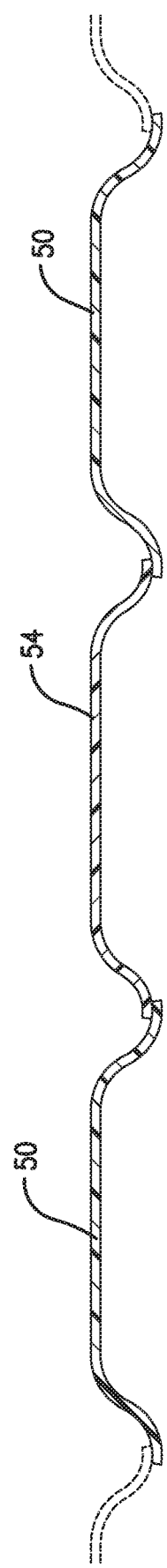
FIG. 11 is a fragmentary cross-sectional elevation view of the stringer sheet showing an alternating method for laying down multiple plies to create multiple stringers.

In addition to the different patterns in which the ply layers may be laid down with respect to particular contours, the multiple stringers of a typical stringer sheet allow for different patterns in which the ply layers may be laid down with respect to the multiple contours of a typical tool. Referring to FIG. 10, a "shingle method" may proceed as follows. The stringer sheet may be constructed by starting each ply layer 50,54 at the same side of the panel, and laying down a series of immediately adjacent sections. As a result, each stringer overlap area tends to have the same left-to-right pattern. Referring to FIG. 11, an "alternating method" may proceed as follows. The stringer sheet may be constructed by laying down a first series of every other ply layer and then laying down a second series of every other ply layer which fill in the uncovered sections. This method configuration may be useful for avoiding interference where adjacent sections are laid down from the same roll at the same time. If the plies are unrolled perpendicular or at an angle to the stringer centerlines, the alternating method may avoid having to reverse direction to achieve an overlap between adjacent sections.

The ply layers may be laid down by hand, with the aid of a device, or automatically by a machine. Wide pre-stacked ply layers having different orientations may be cut to the desired widths to accomplish the desired overlap, and then laid onto and pressed into or onto the tool. The individual or stacked ply layers may be rolled up and transported to the tool, and then unrolled over the tool. The roll of material may be on rails or other mechanisms to facilitate repeatably aligning the ply layers as they leave the roll or as they land on the tool. Achieving the different orientations may be accomplished in any of several ways. For example, the ply layers may be arranged at an angle beforehand on a large flat surface, singly or stacked, and then cut along the stringer centerlines. The resulting parallelogram-shaped segments may be held together with strips of continuous backing tape. For another example, the ply layers may be laid and cut directly onto the tool, being cut at an angle as they are deposited. The ply layers may be forced into or onto the contours of the tool as they are laid down, or by a later process.

Under some circumstances, when a stringer sheet is pressed into a concave tool and then removed and placed on a pre-laid skin, the spliced ply layers could unfold and the staggered or interleaved ply layers could spring back to straightness without the tool to hold them in place. This may be solved in a number of ways. One possible solution may be to extend the ply layer closest to the concave tool to a place in the tool with less curvature. For example, it may be extended to a straighter place in the stringer profile, or extended off the stringer to the base skin area. Another possible solution may be to consolidate or partially cure the ply layers on the concave tool before removing the ply layers from the tool. Another possible solution may be to apply an adhesive, surfacer, or other material on the tool before the first (closest) ply is placed on the tool, at least in an area encompassing the edge of the first ply. This may be a fly-away material or a tape that is removed after curing or before bagging. Another possible solution may be to apply a tacky adhesive near the edge of the first ply layer (on the side away from the tool), so that it will stick to the adjacent ply layer even when removed from the tool. Another possible solution may be to lay up the stringer on the concave tool, and then without removing it from the tool, a bladder, core, or similar device may be installed in the stringers, and then the skin may be laid up to the inside of the stringer sheet. This way, the spliced ply edges would always be contained by the tool.

Figure 12:
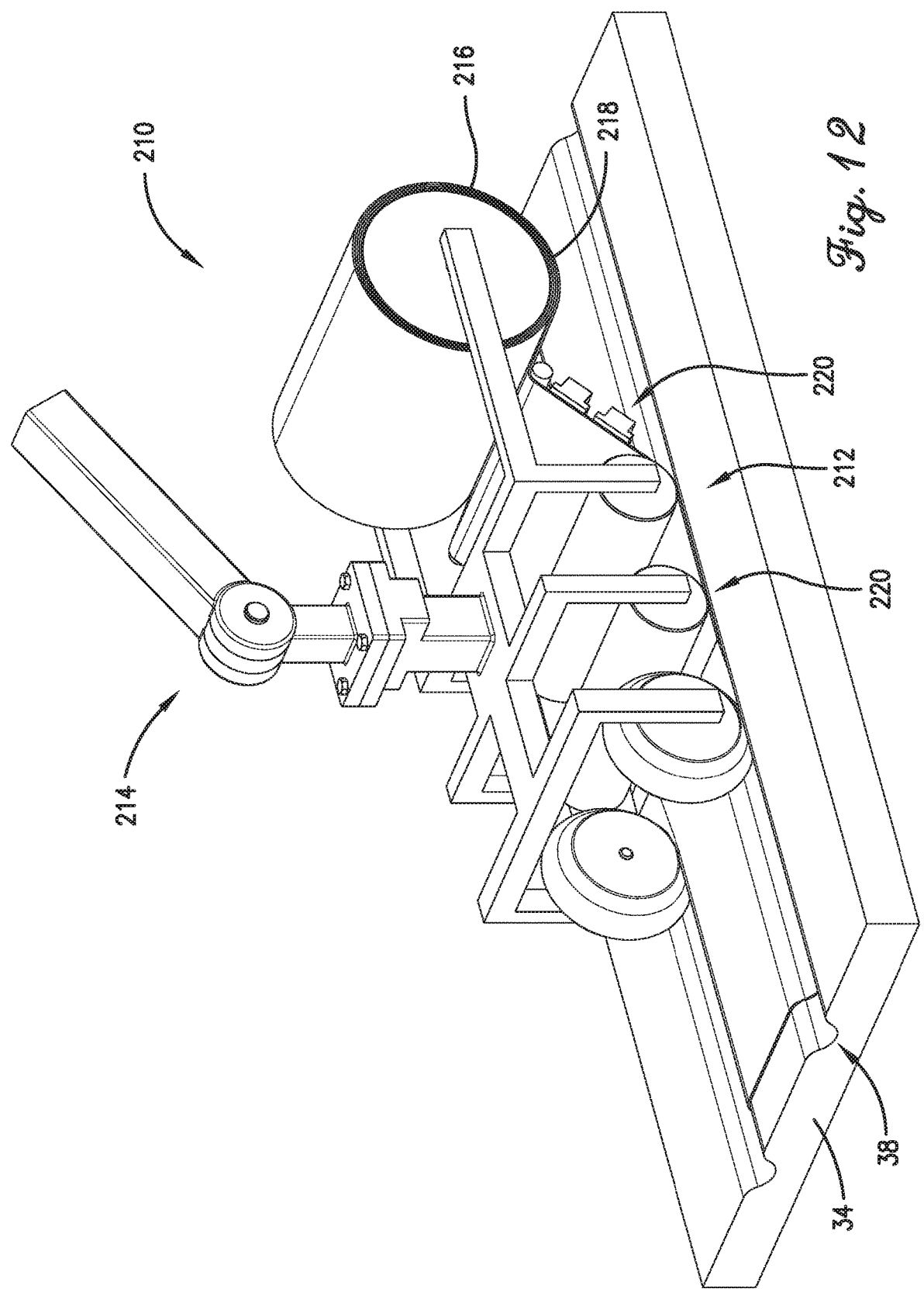
FIG. 12 is a fragmentary isometric view of a first embodiment of a system for splicing a plurality of plies of material together during the construction of a stringer sheet, such as the example stringer sheet of FIG. 2.

As mentioned, a partially or fully automated system may be used to apply the plies to the tool 34, including pressing the ply layers into the contours 38 of the tool 34. Referring to FIG. 12, a first embodiment of such a system 210 may include an end-effector 212 installed on an articulated robot arm 214. The end-effector 212 may include a dispenser 216 of roll of composite material 218 and a set of rollers 220. In operation, the system 210 may implement a version of the method 110 shown in FIG. 3 and described above. The dispenser 216 may carry and dispense the roll of material 218 to create the ply layers. The roll of material 218 may have pre-cut plies, or may use a cutting mechanism similar to that described in U.S. Pat. No. 9,023,176. The roll of material 218 may have one ply or may have a stack of plies, possibly ready to cut with the edges already offset from each other to create the correct staggering of plies. In one implementation, more than one roll of one or many plies of material may be used.

In one implementation, a heater mechanism 220 may heat the ply layers to make them tacky and pliable, so that they stick to the surface of the tool 34 or the other ply layers already laid down, and form to shape. The set of rollers 220 may press the ply layers onto the surface of the tool 34 or onto ply layers already laid down, and press the ply layers into the contours 38. The individual rollers may be shaped to match the particular contours of the tool. In one implementation, a cutting mechanism may adjust the width of the plies being laid down to match the location and spacing of the stringer or to change the overlap distance of the ply layers. In general, the ply layers may be laid down in the same direction as the contours 38 in the tool 34. The articulated robot arm 214 may move the end-effector 212 down the length of the tool 34. In one implementation, rather than moving the same direction as the stringers, the end-effector may be moved across the stringers or at any angle, but the rollers may have to be modified to be able to form onto the shape of the tool. In one implementation, rather than an articulated robot arm, rails or other movement technologies may be used.

Figure 13:
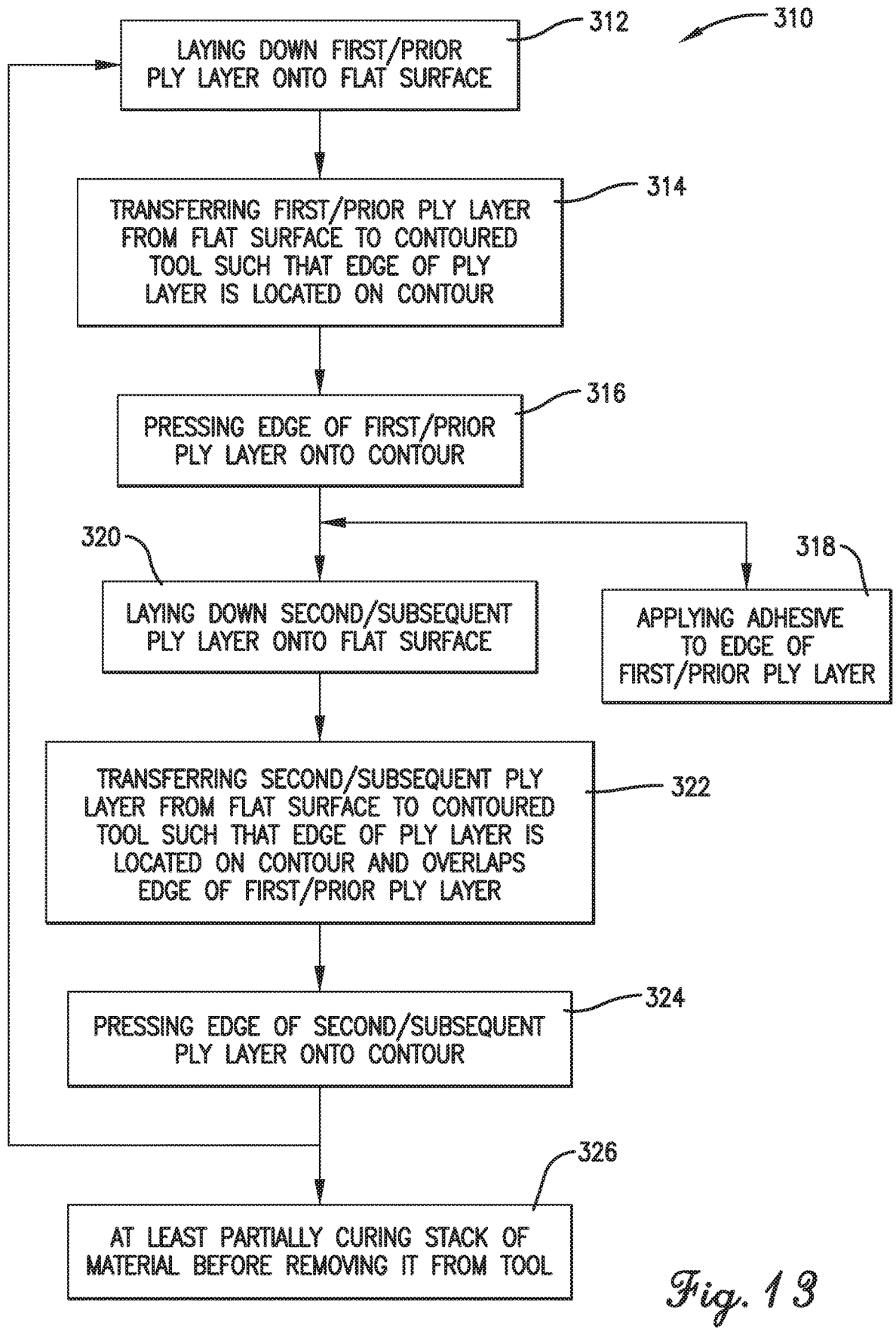
FIG. 13 is a flowchart of steps in a second embodiment of a method for splicing a plurality of plies of material together during the construction of a stringer sheet, such as the example stringer sheet of FIG. 2.

Referring to FIGS. 13-15, second embodiments of a method 310 and system 410 are shown for splicing a plurality of ply layers of material together during the construction of a stringer sheet, such as the example stringer sheet 28 of FIG. 2. The method 310 and system 410 may be substantially similar or identical to the method 110 and system 210 described above, including the different implementations described above, except as follows. Generally, the method 310 and system 410 differ in that rather than dispensing and assembling the individual plies directly on a contoured tool, the individual plies may be initially dispensed and assembled on a flat surface and then transferred (by, e.g., a robotic transfer mechanism) to the contoured tool. For at least some applications, assembling the individual plies in the flat rather on the contoured tool may allow for faster assembly using equipment that is simpler and more robust. Broadly, the method 310 and system 410 may comprise the following steps and components.

A first or other prior ply layer 50 may be laid down onto a flat surface 412 by a dispenser, as shown in 312. The first/prior ply layer 50 may include a single ply, a plurality of plies, or a ply set, as described above. The first/prior ply layer 50 may then be retrieved from the flat surface 412 and transferred to a contoured tool 434 by a transfer mechanism 414, as shown in 314. The tool 434 may be similar or identical to the above-described tool 34 and have a surface 436 and surface contour 438 which defines one of the stringers 30 in the stringer sheet 38, as seen in FIG. 4. The contour 438 may be a concavity, a convexity, or some combination thereof, as described above. The transfer mechanism 414 may be configured to engage and retain the ply layer 50. The transfer mechanism 414 may use substantially any suitable technology for accomplishing this function, such as vacuum cups or electrostatic pads. The transfer mechanism 414 may move the ply layer 50 over the tool 434, and then deposit the ply layer 50 onto the surface 436 of the tool 434.

Once transferred to the tool 434, the ply layer 50 may be pressed into, over, or otherwise onto the contour 438 by a forming mechanism, as shown in 316, such that an overlap region 52 of the edge of the ply layer 50 is located within or otherwise on the contour 438, as shown in 316. In a first implementation, the forming mechanism may be a mechanically driven element incorporated into the transfer device 414 and configured to mechanically actuate to press the ply layer 50 onto the contour 438. In a second implementation, the forming mechanism may be an elastomeric diaphragm that seals to the tool 434 as the ply layer 50 is brought into contact with the tool 434. Air may then be removed from the space between the diaphragm and the tool 434, causing the diaphragm to press the ply layer 50 onto the contour 438. In yet another implementation, once the ply layer 50 is placed onto the surface 436 of the tool 434, one or more rollers may be used to press the ply layer 50 onto the contour 438. In one implementation, an adhesive may be applied to an exposed surface of the first edge 52 of the first/prior ply layer 50, as shown in 318.

A second or other subsequent ply layer 54 may be laid down onto the flat surface 412 by the dispenser, as shown in 320. The second/subsequent ply layer 54 may then be transferred from the flat surface 412 to the contoured tool 434 by the transfer mechanism 414, as shown in 322, such that the second edge 56 of the second/subsequent ply layer 54 overlaps the first edge 52 of the first/prior ply layer 50 along an overlap region 52. In various implementations, the overlap of the first/prior and second/subsequent ply layers 50,54 may be at least one-quarter inch, no more than two inches, no more than one inch, no more than one-half inch, between one-quarter inch and one inch, or between one-quarter inch and one-half inch. Once transferred to the tool 434, the second/subsequent ply layer 54 may be pressed into, over, or otherwise onto the contour 438 and the edge of the first/prior ply layer 50 by the forming mechanism, as shown in 324.

This process may be repeated as needed or desired for additional ply layers to cover a portion or all of the surface 436 of the tool. In the example system 410 shown in FIGS. 14 and 15, the tool 434 may be rotatable beneath the transfer mechanism 414 so as to present a different portion of the surface 436 for each ply layer. In one implementation, the ply layers 50,54 may be at least partially cured before removing them from the tool 434, as shown in 326.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of splicing a plurality of plies of a material together during the construction of a stringer sheet, the method comprising:
   laying down a first ply layer onto a first portion of a surface of a tool, the surface having a contour defining a stringer in the stringer sheet;
   pressing the first ply layer onto the contour such that a first edge of the first ply layer is located on the contour;
   laying down a second ply layer onto a second portion of the surface of the tool, wherein the second portion is adjacent to the first portion of the surface of the tool; and
   pressing the second ply layer onto the contour such that a second edge of the second ply layer is located on the contour with the second ply layer overlapping the first ply layer on the contour.

2. The method of claim 1, wherein—
   the first edge of the first ply layer extends past a center of the contour in a first direction; and the second edge of the second ply layer extends past the center of the contour in a second direction such that the first and second ply layers overlap at a center of the contour.

3. The method of claim 1, wherein—
the first edge of the first ply layer extends past a center of the contour in a first direction; and
the second edge of the second ply layer does not extend past the center of the contour in a second direction such that the first and second ply layers overlap at one side of the contour.

4. The method of claim 3, further including repeating the method to lay down a third ply layer over the first ply layer and a fourth ply layer over the second ply layer, and wherein—
a third edge of the third ply layer does not extend past the center of the contour in the first direction; and
a fourth edge of the fourth ply layer extends past the center of the contour in the second direction such that the third and fourth ply layers overlap at an opposite side of the contour as the first and second ply layers.

5. The method of claim 1, further including at least partially curing the first and second ply layers before removing the first and second ply layers from the tool.

6. The method of claim 1, further including applying an adhesive to the first edge of the first ply layer so that the second edge of the second ply layer overlaps the adhesive.

7. The method of claim 1, wherein the first ply layer and the second ply layer are dispensed directly onto the surface of the tool.

8. The method of claim 1, wherein the first ply layer is dispensed onto a flat surface and then transferred to the surface of the tool, and the second ply layer is dispensed onto the flat surface and then transferred to the surface of the tool.

9. A method of splicing a plurality of plies of a material together during the construction of a stringer sheet, the method comprising:
laying down with a dispenser a first ply layer onto a first portion of a surface of a tool, the surface having a contour defining a stringer in the stringer sheet;
pressing with a roller the first ply layer onto the contour such that a first edge of the first ply layer is located on the contour;
moving the dispenser and laying down with the dispenser a second ply layer onto a second portion of the surface of the tool, wherein the second portion is adjacent to the first portion of the surface of the tool; and
moving the roller and pressing with the roller the second ply layer onto the contour such that a second edge of the second ply layer is located on the contour with the second ply layer overlapping the first ply layer on the contour.

10. The method of claim 9, wherein—
the first edge of the first ply layer extends past a center of the contour in a first direction; and
the second edge of the second ply layer extends past the center of the contour in a second direction such that the first and second ply layers overlap at a center of the contour.

11. The method of claim 9, wherein—
the first edge of the first ply layer extends past a center of the contour in a first direction; and
the second edge of the second ply layer does not extend past the center of the contour in a second direction such that the first and second ply layers overlap at one side of the contour.

12. The method of claim 11, further including repeating the method to lay down a third ply layer over the first ply layer and a fourth ply layer over the second ply layer, and wherein—
a third edge of the third ply layer does not extend past the center of the contour in the first direction; and
a fourth edge of the fourth ply layer extends past the center of the contour in the second direction such that the third and fourth ply layers overlap at an opposite side of the contour as the first and second ply layers.

13. The method of claim 9, further including at least partially curing the first and second ply layers before removing the first and second ply layers from the tool.

14. The method of claim 9, further including applying an adhesive to the first edge of the first ply layer so that the second edge of the second ply layer overlaps the adhesive.

15. The method of claim 9, wherein the first ply layer and the second ply layer are dispensed directly onto the surface of the tool.

16. The method of claim 9, wherein the first ply layer is dispensed onto a flat surface and then transferred to the surface of the tool, and the second ply layer is dispensed onto the flat surface and then transferred to the surface of the tool.

17. A method of splicing a plurality of plies of a material together during the construction of a stringer sheet, the method comprising:
heating with a heater and dispensing with a dispenser a first ply layer onto a flat surface and then transferring the first ply layer to a first portion of a surface of a tool, the surface having a contour defining a stringer in the stringer sheet;
pressing with a roller the first ply layer onto the contour such that a first edge of the first ply layer is located on the contour;
applying an adhesive to a first edge of the first ply layer;
heating with the heater and dispensing with the dispenser a second ply layer onto the flat surface and then transferring the second ply layer to a second portion of the surface of the tool so that a second edge of the second ply layer overlaps the adhesive on the first edge of the first ply layer, wherein the second portion is adjacent to the first portion of the surface of the tool;
pressing with the roller the second ply layer onto the contour such that a second edge of the second ply layer is located on the contour with the second ply layer overlapping the first ply layer on the contour;
at least partially curing the first and second ply layers before removing the first and second ply layers from the tool.

18. The method of claim 17, wherein—
the first edge of the first ply layer extends past a center of the contour in a first direction; and
the second edge of the second ply layer extends past the center of the contour in a second direction such that the first and second ply layers overlap at a center of the contour.

19. The method of claim 17, wherein—
the first edge of the first ply layer extends past a center of the contour in a first direction; and
the second edge of the second ply layer does not extend past the center of the contour in a second direction such that the first and second ply layers overlap at one side of the contour.

20. The method of claim 17, further including repeating the method to dispense and transfer a third ply layer over the first ply layer and a fourth ply layer over the second ply layer, and wherein—
    a third edge of the third ply layer does not extend past the center of the contour in a first direction; and
    a fourth edge of the fourth ply layer extends past the center of the contour in a second direction such that the third and fourth ply layers overlap at an opposite side of the contour as the first and second ply layers.

\* \* \* \* \*